(12) United States Patent
Onishi et al.

(10) Patent No.: US 10,858,045 B2
(45) Date of Patent: Dec. 8, 2020

(54) CENTER PILLAR STRUCTURE

(71) Applicant: Toyota Jidosha Kabushiki Kaisha, Toyota (JP)

(72) Inventors: Yukihiro Onishi, Kariya (JP); Masamichi Tajima, Kariya (JP); Toyohisa Kodama, Kariya (JP); Mikio Nakashima, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/296,741

(22) Filed: Mar. 8, 2019

(65) Prior Publication Data

US 2019/0276089 A1    Sep. 12, 2019

(30) Foreign Application Priority Data

Mar. 12, 2018  (JP) .................................. 2018-044213

(51) Int. Cl.
  *B62D 25/04*  (2006.01)
  *B62D 27/02*  (2006.01)

(52) U.S. Cl.
  CPC .............. *B62D 25/04* (2013.01); *B62D 27/02* (2013.01)

(58) Field of Classification Search
  CPC ................................ B62D 25/04; B62D 27/02
  USPC ..................................................... 296/193.06
  See application file for complete search history.

(56) References Cited

U.S. PATENT DOCUMENTS

| 8,393,672 B2* | 3/2013 | Mori ...................... B23K 26/24 296/193.06 |
| 2010/0194146 A1 | 8/2010 | Nishimura et al. |
| 2011/0095567 A1* | 4/2011 | Ishigame ............. B62D 21/157 296/187.03 |
| 2011/0210581 A1 | 9/2011 | Kunishi et al. |
| 2015/0175212 A1 | 6/2015 | Heo et al. |

FOREIGN PATENT DOCUMENTS

| JP | 2006-044525 A | 2/2006 |
| JP | 2010-173562 A | 8/2010 |
| JP | 2011-218897 A | 11/2011 |
| WO | 2010/055589 A1 | 5/2010 |

* cited by examiner

*Primary Examiner* — Joseph D. Pape
(74) *Attorney, Agent, or Firm* — Dinsmore & Shohl LLP

(57) ABSTRACT

A center pillar structure includes a pillar inner panel, a lower pillar outer panel disposed outward of the pillar inner panel in the vehicle-width direction, and an upper pillar outer panel disposed upward of the lower pillar outer panel in the vehicle-height direction. The lower pillar outer panel includes a side wall portion, a front wall portion connected to a front end of the side wall portion, and a rear wall portion connected to a rear end of the side wall portion. The upper pillar outer panel includes an overlapping portion overlapping the side wall portion, and the overlapping portion is provided at a lower end portion of the upper pillar outer panel in the vehicle-height direction. At least one of the front wall portion and the rear wall portion is provided with a linear bent portion extending in the vehicle-height direction.

19 Claims, 5 Drawing Sheets

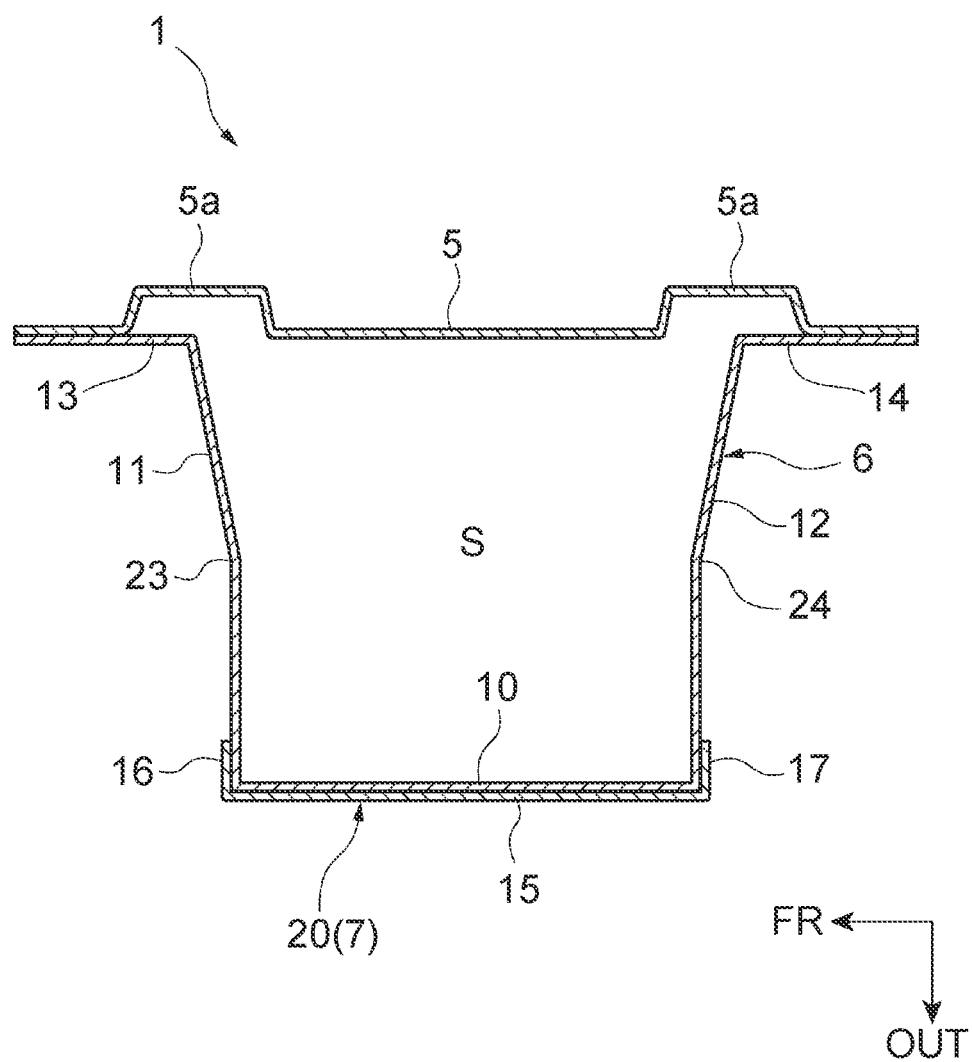

CENTER PILLAR STRUCTURE

CROSS-REFERENCE TO RELATED APPLICATIONS

This application claims priority to Japanese Patent Application No. 2018-044213 filed on Mar. 12, 2018, which is incorporated herein by reference in its entirety including the specification, drawings and abstract.

BACKGROUND

1. Technical Field

The present disclosure relates to a center pillar structure.

2. Description of Related Art

As a center pillar structure, there has been known a technique described in International Publication No. WO 2010/055589, for example. The center pillar structure described in WO 2010/055589 A includes: a pillar inner; an outer reinforcement disposed outward of the pillar inner and forming a closed sectional structure in cooperation with the pillar inner; and a hinge reinforcement disposed inward of the outer reinforcement and reinforcing the outer reinforcement.

SUMMARY

In the meantime, in order to configure a center pillar to be easily broken when the vehicle experiences a side impact, the center pillar might sometimes be designed such that a pillar outer panel (equivalent to an outer reinforcement described in WO 2010/055589 A) is configured by an upper pillar outer panel and a lower pillar outer panel, and a lower end portion of the upper pillar outer panel overlaps the lower pillar outer panel. In this case, a boundary between the lower end of the upper pillar outer panel and the lower pillar outer panel corresponds to a breakable position. In the center pillar structure, when the lower pillar outer panel is deformed from a breakable position as a breakage starting position due to the side impact, a part of the lower pillar outer panel projects outward in the vehicle-width direction, and the lower end of the upper pillar outer panel hits the projecting portion of the lower pillar outer panel, which might cause breakage of the lower pillar outer panel.

The present disclosure provides a center pillar structure capable of restraining breakage of a lower pillar outer panel with a simple structure.

A first aspect of the present disclosure is a center pillar structure installed in a vehicle. The center pillar structure includes: a pillar inner panel; a lower pillar outer panel disposed outward of the pillar inner panel in the vehicle-width direction; and an upper pillar outer panel disposed at a position upward of the lower pillar outer panel in the vehicle-height direction. The lower pillar outer panel includes a side wall portion, a front wall portion connected to a front end of the side wall portion, and a rear wall portion connected to a rear end of the side wall portion. The upper pillar outer panel includes an overlapping portion overlapping the side wall portion, and the overlapping portion is provided at a lower end portion of the upper pillar outer panel in the vehicle-height direction. At least one of the front wall portion and the rear wall portion is provided with a linear bent portion extending in the vehicle-height direction.

According to the center pillar structure of the first aspect, the linear bent portion extending in the vehicle-height direction is provided to at least one of the front wall portion and the rear wall portion of the lower pillar outer panel. Hence, when the lower pillar outer panel is deformed due to a side impact against the vehicle, at least one of the front wall portion and the rear wall portion is buckled from the linear bent portion as a breakage starting position, and thus a part of the lower pillar outer panel is suppressed from projecting outward in the vehicle-width direction. Therefore, the lower end in the vehicle up-down direction of the upper pillar outer panel is restrained from hitting the projecting portion of the lower pillar outer panel. Accordingly, it is possible to restrain breakage of the lower pillar outer panel with a simple configuration.

In the first aspect, the linear bent portion may be provided so as to project into a space surrounded by the side wall portion, the front wall portion, the rear wall portion, and the pillar inner panel.

According to the above configuration, when the lower pillar outer panel is deformed due to a side impact, at least one of the front wall portion and the rear wall portion is smoothly buckled toward the space surrounded by the side wall portion, the front wall portion, the rear wall portion, and the pillar inner panel.

In the first aspect, the linear bent portion may be provided in a region including a predetermined portion of at least one of the front wall portion and the rear wall portion, the predetermined portion corresponding to the overlapping portion.

According to the above configuration, when the lower pillar outer panel is deformed due to a side impact, since the portion of at least one of the front wall portion and the rear wall portion, the portion corresponding to the overlapping portion, is buckled toward the space surrounded by the side wall portion, the front wall portion, the rear wall portion, and the pillar inner panel, at least one of the front wall portion and the rear wall portion is restrained from hitting the side end of the overlapping portion, to be broken.

In the first aspect, the linear bent portion may be provided to the front wall portion so as to project rearward in the vehicle front-rear direction.

In the first aspect, the linear bent portion may be provided in a region including a predetermined portion of the front wall portion, the predetermined portion corresponding to the overlapping portion.

In the first aspect, the linear bent portion may be provided to the rear wall portion so as to project frontward in the vehicle front-rear direction.

In the first aspect, the linear bent portion may be provided in a region including a predetermined portion of the rear wall portion, the predetermined portion corresponding to the overlapping portion.

According to the first aspect of the present disclosure, it is possible to restrain breakage of the lower pillar outer panel with a simple configuration.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is a sectional view taken along line III-III of FIG. 1;

DETAILED DESCRIPTION OF EMBODIMENTS

Hereinafter, embodiments of the present disclosure will be described in detail with reference to the drawings.

Figure 1:
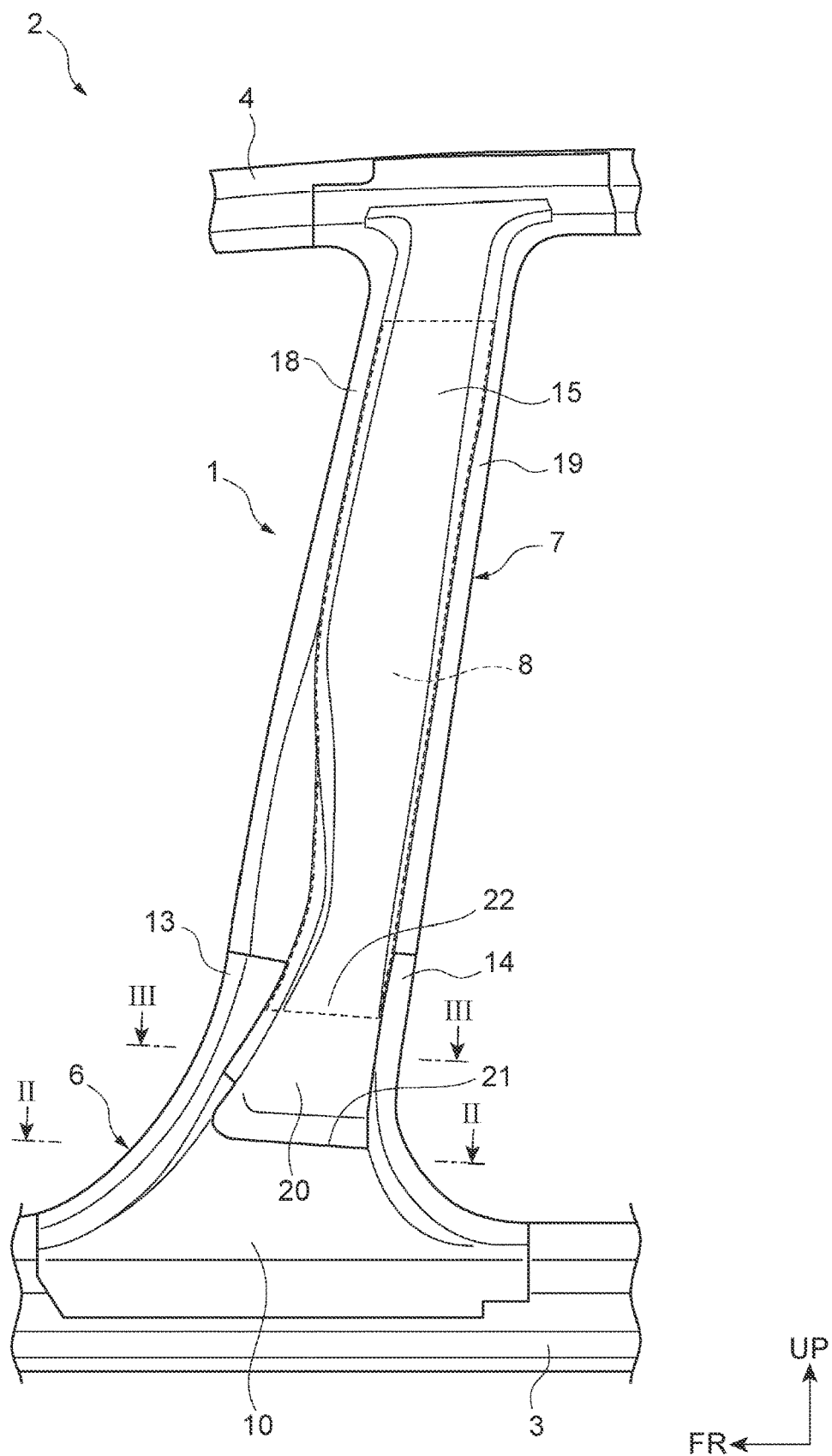
FIG. 1 is a side view showing a center pillar structure according to one embodiment of the present disclosure.
Figure 2:
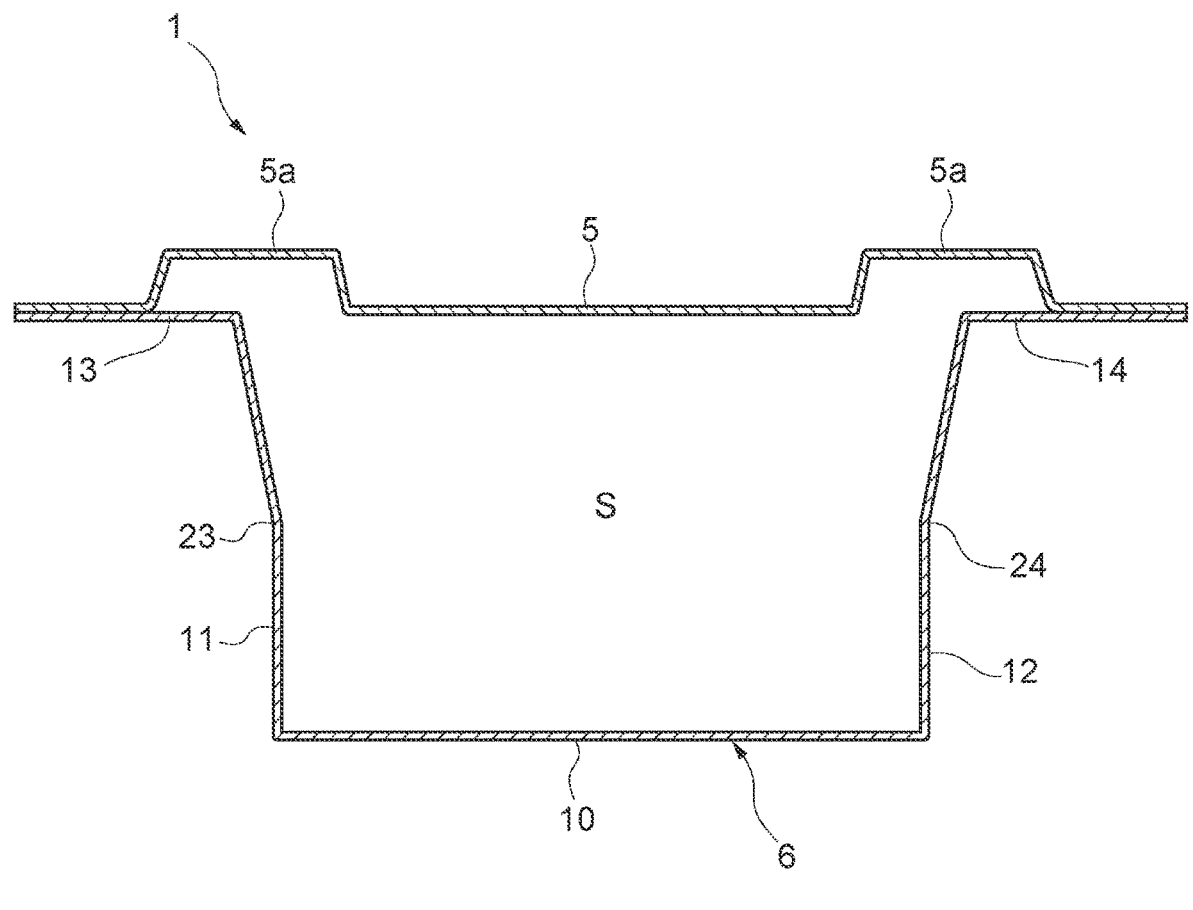
FIG. 2 is a sectional view taken along line II-II of FIG. 1.

FIG. 1 is a side view showing a center pillar structure according to one embodiment of the present disclosure. FIG. 2 is a sectional view taken along line 11-11 of FIG. 1. FIG. 3 is a sectional view taken along line III-III of FIG. 1. In FIG. 1 to FIG. 3, the center pillar 1 is installed to each lateral part of a vehicle 2, and is disposed between a front door and a rear door. Note that an arrow FR in each drawing indicates a front side in the front-rear direction of the vehicle 2, an arrow UP in each drawing indicates an upper side in the up-down (height direction) direction of the vehicle 2, and an arrow OUT in each drawing indicates an outer side in the right-left direction (vehicle-width direction) of the vehicle 2.

A side sill 3 extending in the front-rear direction of the vehicle 2 is disposed to a lower portion of the lateral part of the vehicle 2. A roof side rail 4 extending in the front-rear direction of the vehicle 2 is disposed at an upper portion of the lateral part of the vehicle 2. The center pillar 1 extends in the up-down direction (height direction) of the vehicle 2. A lower end of the center pillar 1 is fixed to the side sill 3. An upper end of the center pillar 1 is fixed to the roof side rail 4.

The center pillar 1 includes: a pillar inner panel 5; a lower pillar outer panel 6 disposed outward in the vehicle-width direction of the pillar inner panel 5; an upper pillar outer panel 7 that is disposed above the lower pillar outer panel 6 located outward in the vehicle-width direction of the pillar inner panel 5; and an outer reinforcement 8 disposed inward in the vehicle-width direction of the upper pillar outer panel 7. Although not illustrated, a side outer panel is disposed outward in the vehicle-width direction of the lower pillar outer panel 6 and the upper pillar outer panel 7.

The pillar inner panel 5, the lower pillar outer panel 6, and the upper pillar outer panel 7 form a closed sectional structure. The pillar inner panel 5 is formed of a steel sheet. The pillar inner panel 5 is provided with two bead portions 5a projecting in a trapezoidal shape inward of the vehicle-width direction.

The lower end of the lower pillar outer panel 6 is joined to the side sill 3. The lower pillar outer panel 6 is formed of a steel sheet made of the same material as that of the pillar inner panel 5, for example. The lower pillar outer panel 6 has a generally hat-like sectional shape. The lower pillar outer panel 6 includes a side wall portion 10, a front wall portion 11, and a rear wall portion 12, and protruding portions 13, 14.

Figure 4A:
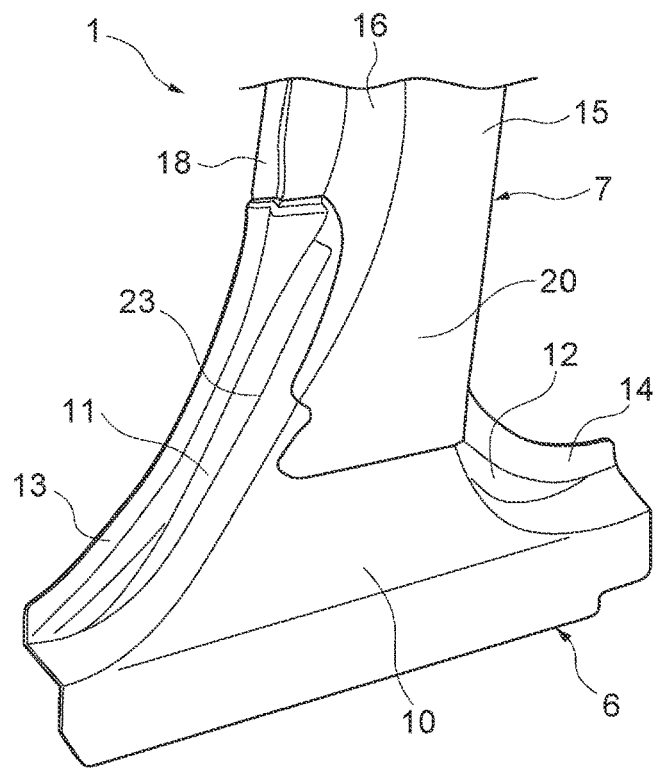
FIG. 4A is a perspective view of a lower part of the center pillar structure shown in FIG. 1, as viewed from the front side.

The side wall portion 10 has a shape that gradually spreads frontward and rearward in a curved shape toward the downward direction. The front wall portion 11 is connected to a front end of the side wall portion 10. The front wall portion 11 is bent inward in the vehicle-width direction from the front end of the side wall portion 10. As shown in FIG. 4A, the front wall portion 11 is formed to extend in a curved shape toward the downwardly frontward direction. The rear wall portion 12 is connected to a rear end of the side wall portion 10. The rear wall portion 12 is bent inward in the vehicle-width direction from the rear end of the side wall portion 10. As shown in FIG. 48, the rear wall portion 12 is formed so as to extend in a curved shape toward the downwardly rearward direction.

The protruding portion 13 is connected to an inner end of the front wall portion 11. The protruding portion 13 is bent frontward from the inner end of the front wall portion 11. The protruding portion 14 is connected to an inner end of the rear wall portion 12. The protruding portion 14 is bent rearward from the inner end of the rear wall portion 12. The protruding portions 13, 14 are joined to the pillar inner panel 5 by spot welding.

An upper end of the upper pillar outer panel 7 is joined to the roof side rail 4. The upper pillar outer panel 7 is formed by an ultra-high tensile strength steel sheet that is harder than the steel sheet of which the lower pillar outer panel 6 is formed. The upper pillar outer panel 7 has a generally hat-like sectional shape. The upper pillar outer panel 7 includes a side wall portion 15, a front wall portion 16, a rear wall portion 17, and protruding portions 18, 19.

The front wall portion 16 is connected to a front end of the side wall portion 15. The front wall portion 16 is bent inward in the vehicle-width direction from the front end of the side wall portion 15. The rear wall portion 17 is connected to a rear end of the side wall portion 15. The rear wall portion 17 is bent inward in the vehicle-width direction from the rear end of the side wall portion 15.

The protruding portion 18 is connected to an inner end of the front wall portion 16. The protruding portion 18 is bent frontward from the inner end of the front wall portion 16. The protruding portion 19 is connected to an inner end of the rear wall portion 17. The protruding portion 19 is bent rearward from the inner end of the rear wall portion 17. The protruding portions 18, 19 are joined to the pillar inner panel 5 by spot welding.

Figure 4B:
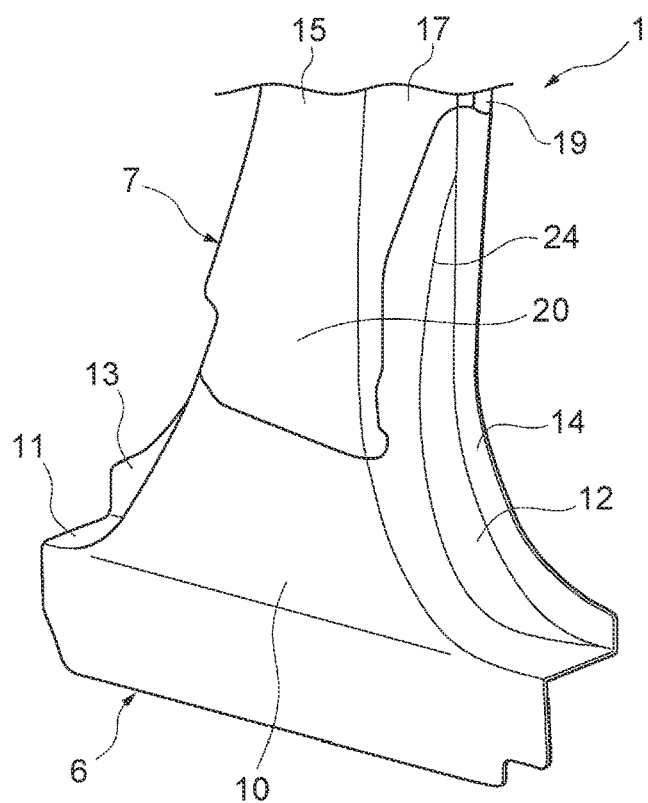
FIG. 4B is a perspective view of the lower part of the center pillar structure shown in FIG. 1, as viewed from the rear side.

A lower end portion of the upper pillar outer panel 7 is provided with an overlapping portion 20 that overlaps the side wall portion 10, the front wall portion 11, and the rear wall portion 12 of the lower pillar outer panel 6. The overlapping portion 20 includes the side wall portion 15, the front wall portion 16, and the rear wall portion 17. The side wall portion 15 in the overlapping portion 20 is located outward in the vehicle-width direction of the side wall portion 10. The front wall portion 16 in the overlapping portion 20 is located frontward of the front wall portion 11. The rear wall portion 17 in the overlapping portion 20 is located rearward of the rear wall portion 12. As shown in FIGS. 4A, 4B, the front wall portion 16 and the rear wall portion 17 in the overlapping portion 20 are formed to have widths gradually narrower toward the downward direction.

The outer reinforcement 8 extends from a position lower than the upper end of the upper pillar outer panel 7 to a position upper than a lower end of the upper pillar outer panel 7. A lower end of the outer reinforcement 8 is located at an upper portion of the overlapping portion 20. The outer reinforcement 8 reinforces the upper pillar outer panel 7.

In the center pillar 1 thus configured, a position corresponding to a boundary between the lower end of the upper pillar outer panel 7 and the lower pillar outer panel 6 is configured as a breakable position 21, and a position corresponding to a boundary between the lower end of the outer reinforcement 8 and the upper pillar outer panel 7 is configured as a breakable position 22. The breakable positions 21, 22 are positions serving as breakage starting positions from which the center pillar 1 is broken when the vehicle 2 receives a side impact.

As shown in FIG. 4A, the front wall portion 11 of the lower pillar outer panel 6 is provided with a linear bent portion 23 extending in the up-down direction (height direction) of the vehicle 2. The linear bent portion 23 is a line serving as a breakage starting position from which the front wall portion 11 is broken when the vehicle 2 receives a side impact. The linear bent portion 23 extends from a position near an upper 26 end of the front wall portion 11 to a lower end of the front wall portion 1. Therefore, the linear bent portion 23 is formed in a region including a portion of the front wall portion 11, the portion corresponding to the overlapping portion 20. Note that "the portion corresponding to the overlapping portion 20" may be "a portion with the same height as the overlapping portion 20".

As shown in FIG. 2 and FIG. 3, the linear bent portion 23 is formed to be a ridge-shaped projection slightly projecting toward the rear side. That is, the linear bent portion 23 is formed in a projecting shape projecting toward a space S that is surrounded by the side wall portion 10, the front wall portion 11, and the rear wall portion 12.

As shown in FIG. 4B, the rear wall portion 12 of the lower pillar outer panel 6 is provided with a linear bent portion 24 extending in the up-down direction (height direction) of the vehicle 2. The linear bent portion 24 is a line serving as a breakage starting position from which the rear wall portion 12 is broken when the vehicle 2 receives a side impact. The linear bent portion 24 extends from a position near an upper end of the rear wall portion 12 to a lower end of the rear wall portion 12. Therefore, the linear bent portion 24 is formed in a region including a portion of the rear wall portion 12, the portion corresponding to the overlapping portion 20.

As shown in FIG. 2 and FIG. 3, the linear bent portion 24 is formed to be a ridge-shaped projection slightly projecting toward the front side. That is, the linear bent portion 24 is formed in a projecting shape projecting toward the space S that is surrounded by the side wall portion 10, the front wall portion 11, and the rear wall portion 12.

Figure 5:
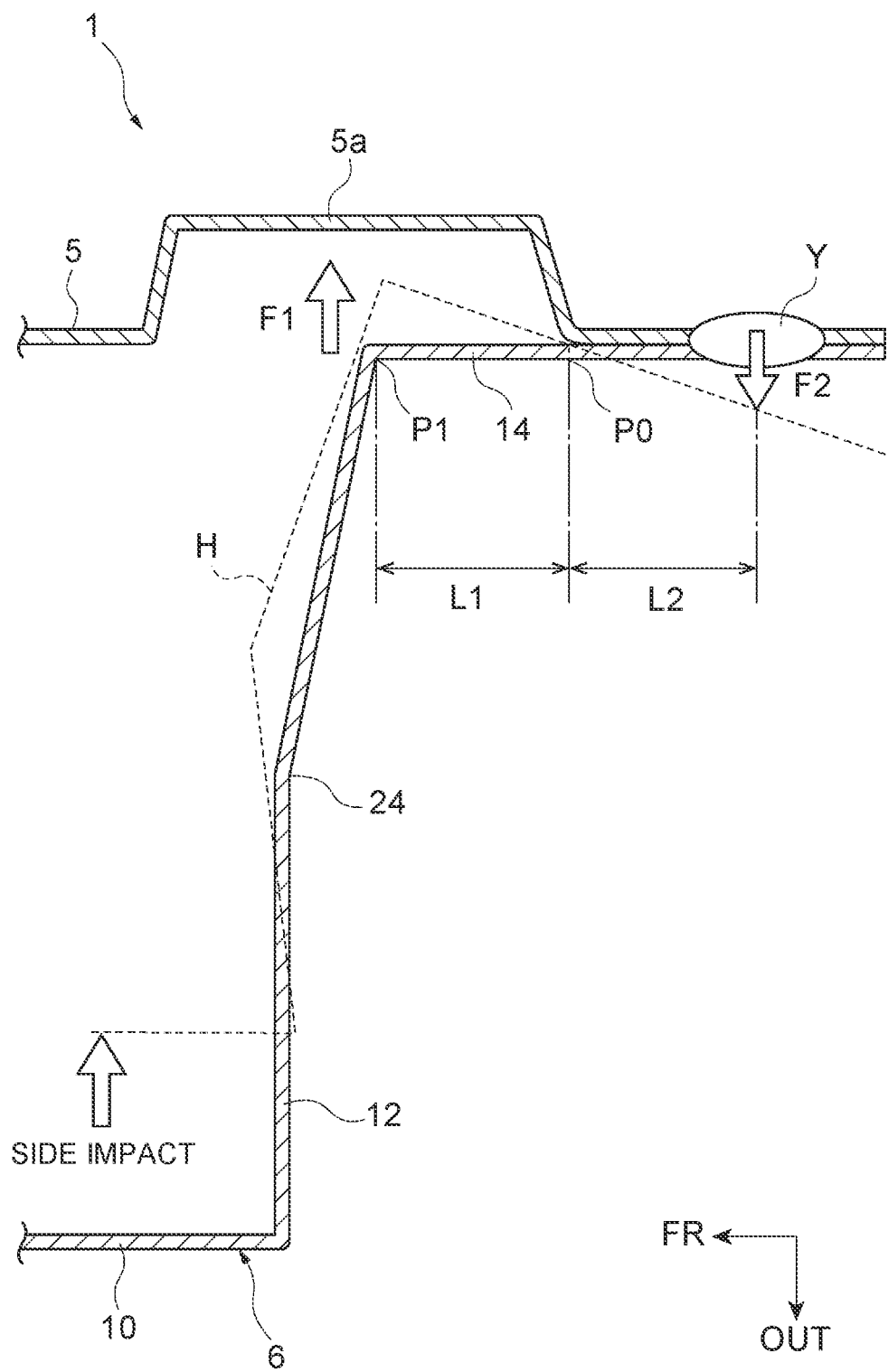
FIG. 5 is a sectional view conceptually showing a state in which a lower pillar outer panel shown in FIG. 2 is deformed.

In the above description, when the vehicle 2 receives a side impact, breakage of the center pillar 1 is initiated at the breakable positions 21, 22. Specifically, as shown in FIG. 5, when the lower pillar outer panel 6 is pushed, the lower pillar outer panel 6 is deformed inward in the vehicle-width direction (see a broken line H in FIG. 5).

Here, when the lower pillar outer panel 6 is pushed, a load applied to a connection point P1 between the rear wall portion 12 and the protruding portion 14 is defined as F1; as the lower pillar outer panel 6 is deformed inward in the vehicle-width direction, a load causing a welding point Y between the pillar inner panel 5 and the protruding portion 14 to be separated is defined as F2; a distance from a connection point P0 between the bead portion 5a of the pillar inner panel 5 and the protruding portion 14 to the connection point P1 between the rear wall portion 12 and the protruding portion 14 is defined as a distance L1; and a distance from the connection point P0 between the bead portion 5a and the protruding portion 14 to the welding point Y between the pillar inner panel 5 and the protruding portion 14 is defined as L2, the following formula is satisfied.

$$F1 \times L1 = F2 \times L2$$

$$F2 = F1 \times L1/L2$$

From the above formula, in order to set the load F2 causing separation at the welding point Y to be smaller, the load F1 applied to the connection point P1 between the rear wall portion 12 and the protruding portion 14 may be set at a smaller value.

The rear wall portion 12 is provided with the linear bent portion 24 extending in the up-down direction (height direction) of the vehicle 2. Hence, when the lower pillar outer panel 6 is pushed due to a side impact, the rear wall portion 12 is buckled along the linear bent portion 24, as indicated by a broken line H in FIG. 5. Therefore, since the load F1 applied to the connection point P1 between the rear wall portion 12 and the protruding portion 14 is reduced, the load F2 causing separation at the welding point Y is reduced. Accordingly, breakage of the welding point Y can be restrained.

In addition, when the lower pillar outer panel 6 is deformed, the side wall portion 10 becomes bent in a wavy form, and thus a part of the side wall portion 10 might project outward in the vehicle-width direction. However, the rear wall portion 12 is buckled along the linear bent portion 24, to thereby suppress a part of the side wall portion 10 from projecting outward in the vehicle-width direction. Accordingly, it is possible to restrain breakage of the lower pillar outer panel 6 due to hitting of the lower end of the upper pillar outer panel 7 against the projecting portion of the side wall portion 10.

According to the above-described present embodiment, the front wall portion 11 of the lower pillar outer panel 6 is provided with the linear bent portion 23 extending in the up-down direction (height direction), and the rear wall portion 12 of the lower pillar outer panel 6 is provided with the linear bent portion 24 extending in the up-down direction (height direction). Therefore, when the lower pillar outer panel 6 is deformed due to a side impact against the vehicle 2, the front wall portion 11 is buckled from the linear bent portion 23 as a breakage starting position, and the rear wall portion 12 is buckled from the linear bent portion 24 as a breakage starting position; thus, it is possible to restrain a part of the lower pillar outer panel 6 from projecting outward in the vehicle-width direction. Hence, the lower end of the upper pillar outer panel 7 is restrained from hitting the projecting portion of the lower pillar outer panel 6. Accordingly, it is possible to restrain breakage of the lower pillar outer panel 6, using a simple configuration. As a result, it is unnecessary to extend the position of the lower end of the upper pillar outer panel 7 to the lower portion of the lower pillar outer panel 6, where the lower pillar outer panel 6 is unlikely to be deformed, in order to restrain breakage of the lower pillar outer panel 6; therefore, it is possible to reduce the weight and cost of the upper pillar outer panel 7.

As aforementioned, since the front wall portion 11 is buckled from the linear bent portion 23 as a breakage starting position and the rear wall portion 12 is buckled from the linear bent portion 24 as a breakage starting position, it is possible to restrain breakage at the welding point Y, using a simple configuration. As a result, it is unnecessary to increase the number of the welding points Y for the purpose of avoiding breakage at the welding points Y, to thus reduce the number of welding steps.

In the present embodiment, the linear bent portions 23, 24 are each formed in a projecting shape projecting toward the space S surrounded by the side wall portion 10, the front wall portion 11, and the rear wall portion 12. Accordingly, when the lower pillar outer panel 6 is deformed due to a side impact, the front wall portion 11 and the rear wall portion 12 are buckled smoothly toward the space S surrounded by the side wall portion 10, the front wall portion 11, and the rear wall portion 12.

Furthermore, in the present embodiment, the linear bent portions 23, 24 are provided in a region including the portions of the front wall portion 11 and the rear wall portion 12, the portions corresponding to the overlapping portion 20. Therefore, when the lower pillar outer panel 6 is deformed due to a side impact, the portions of the front wall portion 11 and the rear wall portion 12, the portions corresponding to the overlapping portion 20, are buckled toward the space S surrounded by the side wall portion 10, the front wall portion 11, and the rear wall portion 12, and thus it is restrained that the front wall portion 11 and the rear wall portion 12 hit the side end of the overlapping portion 20, to be broken.

The present disclosure is not limited to the above-described embodiment. For example, in the above-described embodiment, although the overlapping portion 20 of the upper pillar outer panel 7 includes the side wall portion 15, the front wall portion 16, and the rear wall portion 17, the present disclosure is not limited to this embodiment. The overlapping portion 20 may include only the side wall portion 15. In this case, the overlapping portion 20 overlaps only the side wall portion 15.

In the above embodiment, although the linear bent portions 23, 24 are each formed in a projecting shape projecting toward the space S surrounded by the side wall portion 10, the front wall portion 11, and the rear wall portion 12, the present disclosure is not limited to this configuration. The linear bent portions 23, 24 may be each formed in a projecting shape projecting toward an opposite side to the space S surrounded by the side wall portion 10, the front wall portion 11, and the rear wall portion 12. That is, the linear bent portion 23 may be formed in a projecting shape projecting frontward, and the linear bent portion 24 may be formed in a projecting shape projecting rearward.

If the linear bent portions 23, 24 are formed to project toward the opposite side to the space S surrounded by the side wall portion 10, the front wall portion 11, and the rear wall portion 12, the linear bent portion 23 may be provided to only a portion lower than the portion of the front wall portion 11 corresponding to the overlapping portion 20. The linear bent portion 24 may be provided to only a portion lower than the portion of the rear wall portion 12 corresponding to the overlapping portion 20.

In the above embodiment, although the front wall portion 11 is provided with the linear bent portion 23 and the rear wall portion 12 is provided with the linear bent 26 portion 24, the present disclosure is not limited to this. Only either one of the front wall portion 11 and the rear wall portion 12 may be provided with the linear bent portion.

In the above embodiment, although there is provided the outer reinforcement 8 reinforcing the upper pillar outer panel 7, such an outer reinforcement 8 may not particularly be provided.

What is claimed is:

1. A center pillar structure installed in a vehicle, the center pillar structure comprising:
    a pillar inner panel;
    a lower pillar outer panel disposed outward of the pillar inner panel in a vehicle-width direction, the lower pillar outer panel including a side wall portion, a front wall portion connected to a front end of the side wall portion, and a rear wall portion connected to a rear end of the side wall portion; and
    an upper pillar outer panel disposed upward of the lower pillar outer panel in a vehicle-height direction, the upper pillar outer panel including an overlapping portion overlapping the side wall portion, and the overlapping portion being provided at a lower end portion of the upper pillar outer panel in the vehicle-height direction, wherein
    at least one of the front wall portion and the rear wall portion is provided with a linear bent portion extending in the vehicle-height direction, and
    a boundary between a lower end of the upper pillar outer panel and the lower pillar outer panel is configured as a breakable position.

2. The center pillar structure according to claim 1, wherein the linear bent portion is provided so as to project into a space surrounded by the side wall portion, the front wall portion, the rear wall portion, and the pillar inner panel.

3. The center pillar structure according to claim 2, wherein the linear bent portion is provided in a region including a predetermined portion of at least one of the front wall portion and the rear wall portion, the predetermined portion corresponding to the overlapping portion.

4. The center pillar structure according to claim 1, wherein the linear bent portion is provided to the front wall portion so as to project rearward in a vehicle front-rear direction.

5. The center pillar structure according to claim 4, wherein the linear bent portion is provided in a region including a predetermined portion of the front wall portion, the predetermined portion corresponding to the overlapping portion.

6. The center pillar structure according to claim 1, wherein the linear bent portion is provided to the rear wall portion so as to project frontward in a vehicle front-rear direction.

7. The center pillar structure according to claim 6, wherein the linear bent portion is provided in a region including a predetermined portion of the rear wall portion, the predetermined portion corresponding to the overlapping portion.

8. The center pillar structure according to claim 1, wherein:
    the side wall portion is a first side wall portion, the front wall portion is a first front wall portion, and the rear wall portion is a first rear wall portion;
    the upper pillar outer panel includes a second side wall portion, a second front wall portion connected to a front end of the second side wall portion, and a second rear wall portion connected to a rear end of the second side wall portion;
    the overlapping portion overlaps the first side wall portion, the first front wall portion, and the first rear wall portion;
    at least one of the first front wall portion and the first rear wall portion is only provided with the linear bent portion, and the linear bent portion is not provided at the overlapping portion; and
    a line defines an inner edge of at least one of the second front wall portion and the second rear wall portion in the overlapping portion, and the line extends along the linear bent portion in the vehicle-height direction so as to locate outward of the linear bent portion in the vehicle width direction.

9. A center pillar structure installed in a vehicle, the center pillar structure comprising:
    a pillar inner panel;
    a lower pillar outer panel disposed outward of the pillar inner panel in a vehicle-width direction, the lower pillar outer panel including a side wall portion, a front wall portion connected to a front end of the side wall portion, and a rear wall portion connected to a rear end of the side wall portion; and an upper pillar outer panel disposed upward of the lower pillar outer panel in a vehicle-height direction, the upper pillar outer panel including an overlapping portion overlapping the side wall portion, and the overlapping portion being provided at a lower end portion of the upper pillar outer panel in the vehicle-height direction, the overlapping portion including a front overlapping wall portion and a rear overlapping wall portion each having a width gradually narrowing in the downward direction, wherein at least one of the front wall portion and the rear wall portion is provided with a linear bent portion extending in the vehicle-height direction.

10. The center pillar structure according to claim 9, wherein the linear bent portion is provided so as to project into a space surrounded by the side wall portion, the front wall portion, the rear wall portion, and the pillar inner panel.

11. The center pillar structure according to claim 10, wherein the linear bent portion is provided in a region including a predetermined portion of at least one of the front wall portion and the rear wall portion, the predetermined portion corresponding to the overlapping portion.

12. The center pillar structure according to claim 9, wherein the linear bent portion is provided to the front wall portion so as to project rearward in a vehicle front-rear direction.

13. The center pillar structure according to claim 9, wherein the linear bent portion is provided to the rear wall portion so as to project frontward in a vehicle front-rear direction.

14. A center pillar structure installed in a vehicle, the center pillar structure comprising:

a pillar inner panel;

a lower pillar outer panel disposed outward of the pillar inner panel in a vehicle-width direction, the lower pillar outer panel including a side wall portion, a front wall portion connected to a front end of the side wall portion, and a rear wall portion connected to a rear end of the side wall portion;

an upper pillar outer panel disposed upward of the lower pillar outer panel in a vehicle-height direction, the upper pillar outer panel including an overlapping portion overlapping the side wall portion, and the overlapping portion being provided at a lower end portion of the upper pillar outer panel in the vehicle-height direction; and an outer reinforcement extending from a position lower than an upper end of the upper pillar outer panel to a position higher than a lower end of the upper pillar outer panel, a lower end of the outer reinforcement located at an upper portion of the overlapping portion, wherein at least one of the front wall portion and the rear wall portion is provided with a linear bent portion extending in the vehicle-height direction.

15. The center pillar structure according to claim 14, wherein the linear bent portion is provided so as to project into a space surrounded by the side wall portion, the front wall portion, the rear wall portion, and the pillar inner panel.

16. The center pillar structure according to claim 15, wherein the linear bent portion is provided in a region including a predetermined portion of at least one of the front wall portion and the rear wall portion, the predetermined portion corresponding to the overlapping portion.

17. The center pillar structure according to claim 14, wherein the linear bent portion is provided to the front wall portion so as to project rearward in a vehicle front-rear direction.

18. The center pillar structure according to claim 14, wherein the linear bent portion is provided to the rear wall portion so as to project frontward in a vehicle front-rear direction.

19. The center pillar structure according to claim 14, wherein:

the side wall portion is a first side wall portion, the front wall portion is a first front wall portion, and the rear wall portion is a first rear wall portion;

the upper pillar outer panel includes a second side wall portion, a second front wall portion connected to a front end of the second side wall portion, and a second rear wall portion connected to a rear end of the second side wall portion;

the overlapping portion overlaps the first side wall portion, the first front wall portion, and the first rear wall portion;

at least one of the first front wall portion and the first rear wall portion is only provided with the linear bent portion, and the linear bent portion is not provided at the overlapping portion; and a line defines an inner edge of at least one of the second front wall portion and the second rear wall portion in the overlapping portion, and the line extends along the linear bent portion in the vehicle-height direction so as to locate outward of the linear bent portion in the vehicle width direction.

* * * * *

UNITED STATES PATENT AND TRADEMARK OFFICE
CERTIFICATE OF CORRECTION

PATENT NO. : 10,858,045 B2  
APPLICATION NO. : 16/296741  
DATED : December 8, 2020  
INVENTOR(S) : Yukihiro Onishi et al.

It is certified that error appears in the above-identified patent and that said Letters Patent is hereby corrected as shown below:

On the Title Page

Item (71), applicant, city, delete "Toyota" and insert --Toyota-shi Aichi-ken--, therefor.

Item (72), Inventor 1, city, delete "Kariya" and insert --Kariya-shi Aichi-ken--, therefor.

Item (72), Inventor 2, city, delete "Kariya" and insert --Kariya-shi Aichi-ken--, therefor.

Item (72), Inventor 3, city, delete "Kariya" and insert --Kariya-shi Aichi-ken--, therefor.

Item (72), Inventor 4, city, delete "Toyota" and insert --Toyota-shi Aichi-ken--, therefor.

Item (73), assignee, city, delete "Toyota" and insert --Toyota-shi Aichi-ken--, therefor.

In the Specification

In Column 3, Line(s) 19, delete "11-11" and insert --II-II--, therefor.

In Column 4, Line(s) 6, delete "48" and insert --4B--, therefor.

In Column 5, Line(s) 11, after "upper", delete "26".

In Column 7, Line(s) 46, after "bent", delete "26".

Signed and Sealed this  
Thirtieth Day of March, 2021

Drew Hirshfeld  
*Performing the Functions and Duties of the*  
*Under Secretary of Commerce for Intellectual Property and*  
*Director of the United States Patent and Trademark Office*